United States Patent [19]

Eastwood et al.

[11] Patent Number: 4,645,360

[45] Date of Patent: Feb. 24, 1987

[54] PLAIN BEARINGS AND A METHOD FOR MANUFACTURING PLAIN BEARINGS

[75] Inventors: Barry J. Eastwood, Aylesbury; David R. Eastham, Hemel Hempstead, both of England

[73] Assignee: AEPLC, Rugby, England

[21] Appl. No.: 810,419

[22] Filed: Dec. 18, 1985

[30] Foreign Application Priority Data

Dec. 18, 1984 [GB] United Kingdom ............... 59-31871

[51] Int. Cl.$^4$ ....................... F16C 17/00; B21D 53/10
[52] U.S. Cl. ............................... 384/129; 29/149.5 S; 29/149.5 C; 29/DIG. 12; 29/DIG. 25; 384/907; 384/912
[58] Field of Search .................... 29/149.5 S, 149.5 R, 29/149.5 C, 149.5 NM, DIG. 12, DIG. 25; 384/129, 294, 907, 912

[56] References Cited

U.S. PATENT DOCUMENTS

| | | | |
|---|---|---|---|
| 1,753,435 | 4/1930 | Klocke | 384/129 X |
| 2,648,580 | 8/1953 | Lignian | 29/149.5 R |
| 4,188,079 | 2/1980 | Mori | 384/294 |
| 4,553,856 | 11/1985 | Bierlein et al. | 384/294 X |

FOREIGN PATENT DOCUMENTS

| | | | |
|---|---|---|---|
| 155257 | 9/1985 | European Pat. Off. | 384/912 |
| 2809797 | 3/1979 | Fed. Rep. of Germany | 384/912 |

*Primary Examiner*—Howard N. Goldberg
*Assistant Examiner*—Ronald S. Wallace
*Attorney, Agent, or Firm*—Price, Heneveld, Cooper, DeWitt & Litton

[57] ABSTRACT

A plain bearing comprising a metal backing, an aluminium based bearing alloy layer and a sacrificial overlay of pure tin applied directly to the bearing material without a nickle interlayer. The bearing alloy comprises by weight, 1 to 11% silicon, 8 to 35% tin, 0.2 to 2% copper with the balance being aluminium.

14 Claims, No Drawings

PLAIN BEARINGS AND A METHOD FOR MANUFACTURING PLAIN BEARINGS

BACKGROUND OF THE INVENTION

The present invention relates to plain bearings using aluminium based alloys as the bearing materials, for example for use in medium speed diesel engines.

Medium speed diesel engine connecting rod and main bearings, using a lining material of AlSn20Cu1 were originally produced without an overlay. However, in some instances these engines could be assembled with more in-built dirt than could be tolerated by the lining alone. This resulted in early seizure. The solution to the problem was to overlay plate the AlSn20Cu1 with lead/tin or lead/tin/copper, using a nickel interlayer.

For many years, bearings incorporating a nickel interlayer were extremely satisfactory. However, in recent years, particularly with the increased use of lower and lower quality residual fuel oils, overlay life in many engines has been drastically reduced due to a combination of corrosion and abrasion. The result of this is that relatively large areas of nickel interlayer can be exposed in a relatively short time. There is very strong circumstantial evidence to suggest that this exposed nickel at some stage becomes harmful and can inhibit further satisfactory bearing operation and may result in seizure.

SUMMARY OF THE INVENTION

It is an object of the present invention to formulate overlay and lining specifications which are more tolerant of the increasingly arduous conditions being imposed on bearings by the modern medium speed diesel engine.

It is a further object of the present invention to provide a bearing having an equivalent fatigue strength to aluminium alloys containing 20% tin and 1% copper, and exhibiting improved anti-seizure properties, improved conformability, improved compatibility, and good dirt embeddability.

"Conformability" is the term given to the ability of bearing lining to accept small misalignments between itself and the rotating member, while "compatibility" is the ability to resist local welding between the bearing alloy and the counterface in regions of asperity contact during rubbing.

According to the present invention there is provided a plain bearing comprising a metal backing, an aluminium based bearing alloy layer and a sacrificial overlay of pure tin without a nickel interlayer, the bearing alloy comprising from 1 to 11% silicon by weight, from 8 to 35% tin by weight and from 0.2 to 3% copper by weight, the balance being aluminium (and incidental impurities associated with the aluminium) the tin overlay being from 1 to 30 $\mu$m in thickness.

The tin layer, which is sacrificial, may be worn away after an initial running-in period, e g., of some hours, to expose the bearing material beneath; hence, the absence of a nickel interlayer is most important.

Preferably, the tin overlay is a matte deposit which may be applied by electroplating in a stannous sulphate solution. More preferably, however, the tin is deposited by immersion in a sodium stannate solution, since this method tends to produce a tin layer which is bonded more securely to the alloy layer. Although the tin layer is sacrificial, it nevertheless must be sufficiently attached to remain in position until the bearing has been assembled for running-in.

The silicon content of the bearing alloy is preferably from 2 to 8%, more preferably from 3 to 5%, for example 4% by weight. The tin content is preferably from 8 to 20%, for example 10 or 11% by weight, and the copper content is preferably 0.5 to 2%, for example 1% by weight.

The tin deposition may require the use of a specialised activation process to acquire good adhesion of deposit to the aluminium, e.g., immersion in a zincate or tinning solution. Preferably, the tin layer is no more than 20 $\mu$m thick, e.g., 2 to 10 $\mu$m more preferably 2 to 5 $\mu$m.

It has been found that bearing alloys in accordance with the invention meet the long term objects of the invention and possess the necessary attributes in respect of fatigue strength, anti-seizure properties, compatibility, conformability. Preferably, the tin in the alloy is reticular. "Reticular" as applied to an aluminium/tin alloy refers to one in which the aluminium and tin phases are both continuous, the tin phase being continuous along the aluminium grain edges or trigonal boundaries.

The silicon is preferably in particulate form in the alloy and a large proportion preferably more than half, e.g., about 60%, is substantially incorporated or encapsulated within the tin phase. It is believed that the good properties of bearings in accordance with the invention may possibly only be obtained when the tin is reticular and incorporates the silicon. The question of silicon particle size is important for proper seizure resistance. Particles should preferably not exceed 20 microns and are more preferably all less than 4 microns. In fact, it may be desirable to include in the alloy a small quantity, e.g., 0.05%, of strontium or small quantity, e.g., 0.05%, of sodium so as to modify the silicon eutectic and reduce the particle size.

With a tin content of at least 8%, the alloy cannot easily be hot-rolled without the risk of the tin being squeezed out. Thus, a silicon content approaching 3 to 5% by weight is preferred since such an alloy has been found to be capable of being cold rolled and it can also be machined easily. Furthermore, where normal cutting tools are used for materials in accordance with the invention, wear on the tools may be reduced.

The backing is preferably of steel or aluminium or aluminium alloy, though where a steel backing is used, an aluminium or aluminium alloy foil layer is used between the steel and the bearing alloy to assist in bonding. The bearing may be formed directly or first formed as a blank and subsequently formed into the desired shape.

The invention also extends to a method of manufacturing a plain bearing in which a bearing alloy comprising, by weight, 1 to 11% Si, 8 to 35% Sn, 0.2 to 3% Cu, the balance being aluminium, is bonded to a metal backing, and a pure tin, sacrificial overlay is applied directly to the bearing alloy alloy to a thickness of 1 to 30 $\mu$m.

In order to assess the fatigue strength to the bearing alloy, a bearing having a lining in accordance with the present invention, but without an overlay, was tested under dynamic loading conditions running against a shaft to which eccentrically positioned weights were attached. The material in accordance with the invention was an alloy comprising Al Si4 Sn11 Cu1 and this was compared with two existing alloys, namely, Al Sn 20 Cu1 and Al Si11 Cu1. After 20 hours at a specific load of 34N/mm$^2$, the bearing in accordance with the invention showed no fatigue failure while the two bearings having linings of the known materials had both failed.

Regarding the compatibility of the bearing alloy, a bearing bush having a lining in accordance with the invention, but without an overlay, was tested against one lined with the known Al Sn20 Cu1 alloy. In the test, a cylindrical bush ⅝ inch (1.6 cm) diameter ¾ inch (1.9 cm) in length was located on a shaft. The shaft was rotated at 1500 rpm for 1½ minutes under lubrication and then left stationary for 4½ minutes to allow the lubricant to be squeezed out of the loaded area of the bearing. The test cycle consisted of repeating this sequence 10 times. The test cycle was repeated with different upward loads applied to the bush, then further tested for 1300 test cycles at maximum load. The results are summarised in Table 1.

TABLE 1

| Alloy | Load in MPa at seizure | | | | | 1300 cycles at 15 N/mm² |
|---|---|---|---|---|---|---|
|  | 3 | 6 | 9 | 12 | 15 | seizure survival |
| Al Sn20 Cu1 |  | 3 | 2 | 1 |  |  |
| Al Si4 Sn11 Cu1 |  | 2 |  |  |  | 4 |

Six samples of each material were tested and as can be seen from Table 1, the compatibility of the material in accordance with the invention showed much improvement.

A bearing with an overlay in accordance with the invention was also tested against one known material to assess the relative seizure resistance.

Thus, "Sapphire" seizure tests have been carried out to compare the performance against a steel shaft of Al Sn11 Si4Cu1 having a 5 μm Sn overlay, with AlSn20 Cu1 plated with 5 μm Ni and an overlay of PbSn, and then heat treated for 100 hours at 160° C. to simulate overlay wear and the formation of a nickel/tin intermetallic compound as would normally be found during the running in of a bearing. The tin overlay without a nickel interlayer does not form any such intermetallic compound.

The Sapphire seizure test was carried out on a Sapphire test rig under the following conditions:
1. The bearings were machined to half length to facilitate the use of higher specific loads than can normally be obtained on full size bearings.
2. The lubricating oil (SAE10) was preheated to 120° C.
3. The rig was run for 1 hour at 100 MPa.
4. The load was increased by 20 MPa and the rig run for 10 minutes at the new load. This procedure was repeated until seizure occurred or the back of the bearing temperature rose rapidly to above 160° C.

The load at which seizure occurred is the Sapphire seizure rating.

The results are shown in Table 2.

TABLE 2

| Bearing | Seizure Load (MPa) against Steel |
|---|---|
| Al Sn11 Si4 Cu1 + Sn | 253 |
| Al Sn20 Cu1 + Ni + PbSn | 173 |

Each of the above results is the mean of several tests. From the results it is concluded that the bearing in accordance with the invention is more seizure resistant than Al Sn 20 Cu1 having a PbSn overlay which has worn through to expose nickel and nickel/tin intermetallic.

Thus, by providing a sacrificial layer of pure tin over the preferred bearing material, a partiuclarly suitable plain bearing may be produced for use in contemporary medium speed diesel engines since the tin may offer excellent running-in properties than the bearing alloy provides the desired bearing characteristics after the tin has worn away. Conventional overlay plated materials on the other hand may become more seizure prone once the protective overlay has worn through.

It has been suggested in some prior art references that other additions such as chromium or manganese might be added to this general type of bearing material in order to increases its strength. However, it is believed that in the case of the present invention, these additions could well interfere with the reticulation of the tin phase, and as a consequence lower the fatigue strength.

Table 3 shows examples of preferred bearing alloy compositions in accordance with the invention. The figures are all weight percentages and the balance in each case is aluminium. In all cases, about 60% of the silicon is substantially contained within the tin phase.

TABLE 3

|  | Silicon | Tin | Copper |
|---|---|---|---|
| A | 1 | 9 | 0.5 |
| B | 1 | 30 | 1 |
| C | 2 | 20 | 1 |
| D | 4 | 10 | 1 |
| E | 4 | 11 | 2 |
| F | 8 | 8 | 3 |
| G | 8 | 35 | 3 |

Preliminary tests suggest that, of the examples shown in the table, alloy compositions C, D, E and F exhibit the more favourable properties. Of these, composition D is the most preferred, followed by composition E.

DESCRIPTION OF THE PREFERRED EMBODIMENTS

The invention may be carried into practice in various ways and one method of preparing a steel-backed bearing strip for forming bearings in accordance with the invention will now be described by way of example.

A rectangular billet 25 mm thick and 340 mm wide is cast and cut into lengths of 250 mm to produce billets for rolling. These billets are annealsed at 490° C. for 16 hours and then machined from 25 to 19 mm thick. The billets are then abraded on one surface using a belt finisher, and then a 0.81 mm thick foil of aluminium which has been vapour degreased and scratch brushed is clad to the prepared surface of the billet to form clad alloy.

After cladding, the clad alloy is rolled down to 2.3 mm in passes of 0.75 mm. The finished clad alloy strip is trimmed and bonded to the steel backing after both the aluminium surface and the steel has been vapour degreased; the aluminium has been scratch brushed and the steel surface belt finished. The bimetal is then annealed at 350° C. for 3 hours to obtain the desired properties and the strip is formed into bearings.

The bearings are cleaned conventionally in alkaline cleaners based on sodium hydroxide, followed by an acid dip (10% hydrochloric or 10% sulphuric acid may be used). The bearings are then tinned by immersion in a sodium stannate solution comprising 280±30 g/l of sodium stannate at a temperature of 70° C.±5° C. for 1 minuite. After tinning, the bearings are passed to a drying section which may be hot water followed by an air blow or immersion in a deep watering oil.

In an alternative but less preferred method, after formation, the bearings are cleaned using conventional cleaners, subjected to a zincating solution and then a pure tin overlay is applied to the bearing alloy surface by electroplating.

The zincating step may be a straight immersion for about 60 seconds or may be an immersion for about 3 minutes where the first 20 seconds are without current and for the subsequent 2 minutes 40 seconds, the component is used cathodically at a current density of 0.7 A/dm$^2$. The tin overlay is applied by immersing the bearing alloy surface in a plating bath containing 40–60 g/l of stannous sulphate, 80–120 g/l of phenol sulphonic acid, 50/70 g/l of sulphuric acid and 50 ml/l of a proprietory addition agent. A current density of 2 A/dm$^2$±0.5 A/dm$^2$ is applied for plating time of between 3 and 10 minutes until a layer of pure tin 5 μm thick has been deposited.

We claim:

1. A plain bearing comprising a metal backing, an aluminium based bearing alloy layer and a sacrificial overlay of pure tin applied directly to said bearing layer without a nickel interlayer, said bearing alloy comprising from 1 to 11% silicon by weight, from 8 to 35% tin by weight and from 0.2 to 3% copper by weight the balance being aluminium, said tin overlay being from 1 to 30 μm in thickness.

2. A bearing according to claim 1 wherein said tin overlay is a matte deposit.

3. A bearing according to claim 1 wherein the silicon content of said bearing alloy is from 2 to 8% by weight.

4. A bearing according to claim 1 wherein the tin content of said bearing alloy is from 8 to 20% by weight.

5. A bearing according to claim 1 wherein the copper content of the bearing alloy is from 0.5 to 2% by weight.

6. A bearing according to claim 1 wherein said bearing alloy comprises 4% silicon by weight, 11% tin by weight and 1% copper by weight, the balance being aluminium.

7. A bearing according to claim 1 wherein said overlay of tin has a thickness of 2 to 10 μm.

8. A bearing according to claim 1 wherein the tin in said bearing alloy is reticular.

9. A bearing according to claim 1 wherein the silicon in said bearing alloy is in particulate form, more than half of which is incorporated within the tin phase.

10. A bearing according to claim 9 wherein the silicon particles are less than 20 microns in size.

11. A bearing according to claim 1 wherein said bearing alloy further includes 0.05% by weight of strontium.

12. A bearing according to claim 1 wherein said bearing alloy further includes 0.05% by weight sodium.

13. A method of forming a plain bearing comprising a metal backing, a bearing alloy layer comprising, by weight, 1 to 11% silicon, 8 to 35% tin, 0.2 to 3% copper, the balance being aluminium, and pure tin sacrificial overlay; said method comprising the steps of providing a metal backing, bonding thereto said bearing alloy layer, and applying directly to said bearing alloy layer said tin overlay to a thickness of 1 to 30 μm.

14. A method according to claim 13 wherein said pure tin overlay is applied to said bearing alloy by immersion in a sodium stannate solution.

* * * * *